United States Patent [19]

Sakai et al.

[11] Patent Number: 5,127,418
[45] Date of Patent: * Jul. 7, 1992

[54] ULTRASONIC DIAGNOSTIC APPARATUS

[75] Inventors: Ikuo Sakai, Kawasaki; Yasuhiro Nakamura; Masami Kawabuchi, both of Yokohama, all of Japan

[73] Assignee: Matsushita Electric Industrial Co., Ltd., Osaka, Japan

[ * ] Notice: The portion of the term of this patent subsequent to Dec. 25, 2007 has been disclaimed.

[21] Appl. No.: 543,890

[22] Filed: Jun. 27, 1990

Related U.S. Application Data

[63] Continuation-in-part of Ser. No. 254,834, Oct. 7, 1988, Pat. No. 4,979,513.

[30] Foreign Application Priority Data

Jun. 29, 1989 [JP] Japan ................................. 1-169290

[51] Int. Cl.⁵ .............................................. A61B 8/06
[52] U.S. Cl. ............................... 128/661.09; 73/861.25
[58] Field of Search ................... 128/661.09; 73/861.25

[56] References Cited

U.S. PATENT DOCUMENTS 4,265,126  5/1981  Papadofrangakis et al. .
4,742,830  5/1988  Tamano et al. ................. 128/661.09
4,979,513  12/1990  Sakai et al. .

FOREIGN PATENT DOCUMENTS 144968  6/1985  European Pat. Off. .
312059  4/1989  European Pat. Off. .
58-188433  11/1983  Japan .

OTHER PUBLICATIONS

Japanese Journal of Applied Physics/Supplement, vol. 26, supplement 26-1, 1987, pp. 9-13, Tokyo, JP; C. Kasai et al "Real-Time Two-Dimensional Blood Flow Imaging Using Ultrasound Dopper".

*Primary Examiner*—Francis Jaworski
*Attorney, Agent, or Firm*—Lowe, Price, LeBlanc & Becker

[57] ABSTRACT

Pulses of an ultrasonic wave beam are emitted into a body at a predetermined repetition period. Echo pulses of the ultrasonic wave beam are received via a pulrality of different channels. Each of the received pulses is converted into corresponding electric signals of the respective channels. A pair of adders invert signs of alternate ones of pairs of the electric signals of adjacent channels, summing the inverted sign electric signals with remaining non-inverted sign electric signals, converting the electric signals into a pair of complex signals having phases which are spatially different from each other by 90 degrees. An autocorrelation function of the complex signals is calculated. A component of a speed of moving matter within the body in a predetermined direction is calculated on the basis of the autocorrelation function. The moving matter causes the echo pulses. The predetermined direction is perpendicular to a direction of travel of the ultrasonic wave beam pulses.

3 Claims, 4 Drawing Sheets

ULTRASONIC DIAGNOSTIC APPARATUS

CROSS-REFERENCES

This application is a continuation-in-part of U.S. patent application Ser. No. 254,934 filed on Oct. 1988, and now U.S. Pat. No. 4,979,513.

BACKGROUND OF THE INVENTION

1. Field of the Invention

This invention relates to an ultrasonic diagnostic apparatus measuring and indicating a distribution of speeds of moving liquid, flowing blood, or other moving portions within a body.

1. Description of the Prior Art

Japanese published unexamined patent application 58-188433 discloses an ultrasonic diagnostic apparatus measuring and indicating a distribution of speeds of moving portions of a body. This prior-art apparatus uses the Doppler effect in determining the speeds. In the prior art apparatus, the use of the Doppler effect makes it impossible to detect components of speeds in directions perpendicular to directions of travel of ultrasonic waves The undetected speed components tend to cause unreliable measurement and indication of a distribution of speeds.

SUMMARY OF THE INVENTION

It is an object of the invention to provide an ultrasonic diagnostic apparatus which measures and indicates a component of a speed of a moving body portion in a direction perpendicular to a direction of travel of an ultrasonic wave beam.

According to this invention, an ultrasonic diagnostic apparatus comprises means for emitting pulses of an ultrasonic wave beam into a body at a predetermined repetition period; means for receiving echo pulses of the ultrasonic wave beam via a plurality of different channels, and for simultaneously converting each of the received pulses into corresponding electric signals of the respective channels; a pair of adder means for inverting signs of alternate ones of pairs of the electric signals of adjacent channels, for summing the inverted sign electric signals with remaining non-inverted sign electric signals, and for converting the electric signals into a pair of complex signals having phases which are spatially different from each other by 90 degrees; means for calculating an autocorrelation function of the complex signals; and means for calculating a component of a speed of moving matter within the body in a predetermined direction on the basis of the autocorrelation function, wherein the moving matter causes the echo pulses and wherein the predetermined direction is perpendicular to a direction of travel of the ultrasonic wave beam pulses.

DESCRIPTION OF THE FIRST PREFERRED EMBODIMENT

Figure 1:
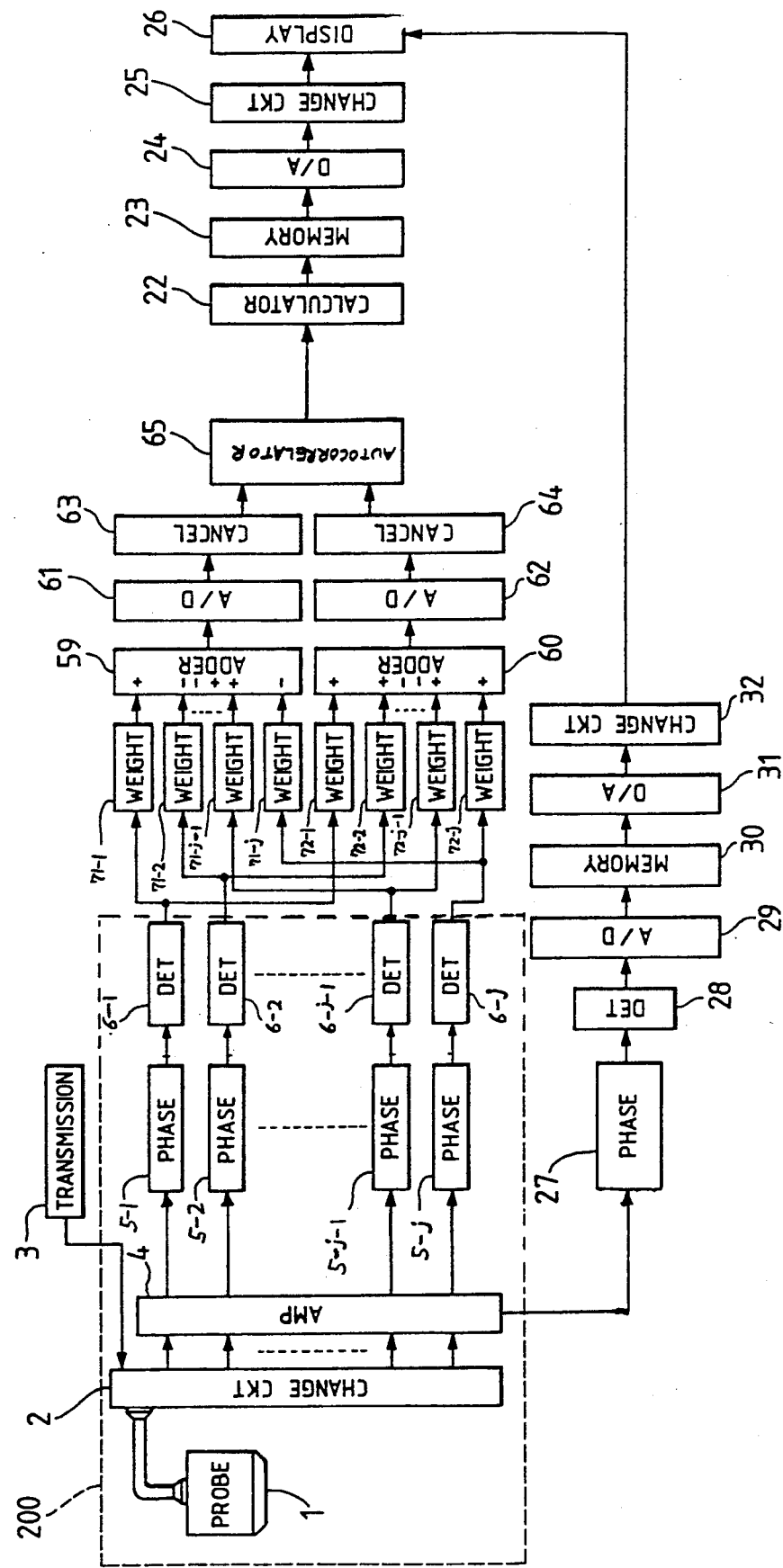
FIG. 1 is a block diagram of an ultrasonic diagnostic apparatus according to a first embodiment of this invention.
Figure 2:
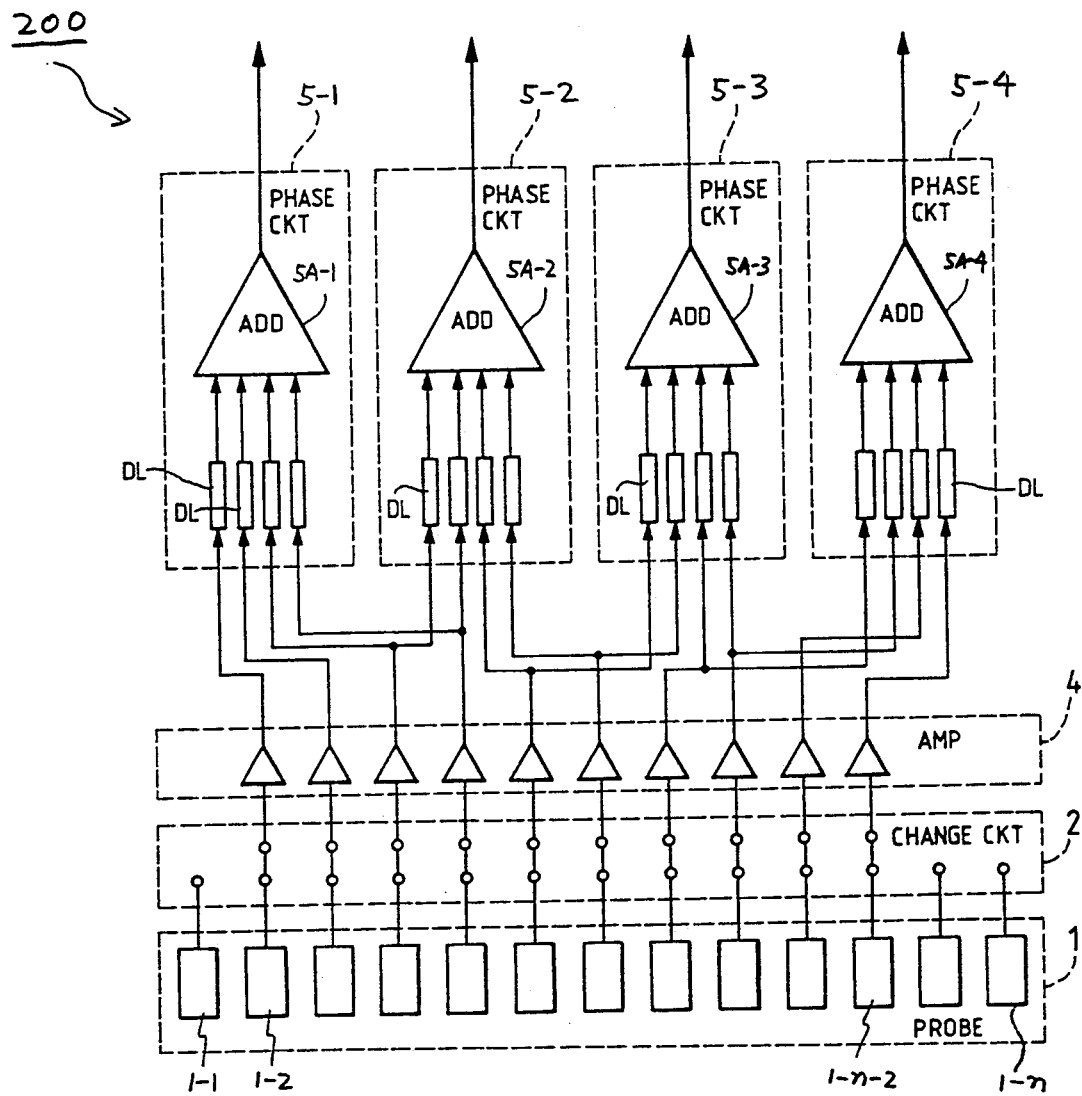
FIG. 2 is a block diagram of part of the parallel receiving circuit of FIG. 1.

With reference to FIGS. 1 and 2, an ultrasonic diagnostic apparatus includes an ultrasonic probe 1 having an in-line array of a predetermined number of strip-shaped electro-acoustic transducer elements 1-1, 1-2, . . . , 1-$n$, where "n" corresponds to the number of the transducer elements. The array of the transducer elements serves to emit a pulse beam of ultrasonic waves into a body (not shown). The transducer elements 1-1, 1-2, . . . 1-$n$ are connected to a change circuit 2.

In the embodiment of FIG. 2, during the transmission of ultrasonic wave beam pulses, the change circuit 2 sequentially selects ten of the transducer elements 1-1, 1-2, . . . , 1-$n$ and connects a transmission circuit 3 to the selected transducer elements. Accordingly, ultrasonic wave beam pulses are simultaneously emitted from ten transducer elements. In the embodiment of FIG. 2, during the reception of echoes of ultrasonic wave beam pulses, the change circuit 2 selects four adjacent reception channels and connects the selected channels to reception amplifiers 4 and in turn to phasing circuits 5-1, 5-2, . . . , 5-$j$. Here, "j" corresponds to the number of the selected or activated reception channels which equals four in the embodiment of FIG. 2. Each channel is composed of four transducer elements.

The transmission circuit 3 generates electric transmission pulses driving the ultrasonic probe 1 and also adjusts the phases of the electric transmission pulses to control a pulse beam of ultrasonic waves omitted from the activated transducer elements.

The phasing circuits 5-1, 5-2, . . . , 5-$j$ are subjected to received signals outputted from the respective transducer elements belonging to the activated reception channels, and controls the reception directivity by adjusting the phases of the received signals.

Received signals of respective reception channels which are outputted from the phasing circuits 5-1, 5-2, . . . , 5-$j$ are detected by detectors 6-1, 6-2, . . . , 6-$j$ respectively. The ultrasonic probe 1, the change circuit 2, the reception amplifiers 4, the phasing circuits 5-1, 5-2, . . . , 5-$j$, and the detectors 6-1, 6-2, . . . 6-$j$ compose a parallel receiving circuit 200. Detected signals outputted from the detectors 6-1, 6-2, . . . , 6-$j$ are transmitted to adders 59 and 60 via weighting devices 71-1, 71-2, . . . , 71-$j$, 72-1, 72-2, . . . , 72-$j$. The weighting process performed by the devices 71-1, 71-2, . . . , 71-$j$, 72-1, 72-2, . . . , 72-$j$ is similar to a window process in general frequency analysis and serves to suppress a side lobe of a frequency spectrum in a spatial frequency range.

The adders 59 and 60 sum output received signals from the weighting devices 71-1, 71-2, . . . , 71-$j$, 72-1, 72-2, . . . , 72-$j$ in such a manner that the signs of alternate groups are inverted, each group being composed of the received signals of two adjacent reception channels. The ways of the sign changes in the adders 59 and 60 are shifted from each other by a quantity corresponding to one reception channel. This design enables the adders 59 and 60 to output complex detection signals having phases spatially different from each other by 90 degrees.

The complex detection signals outputted from the adders 59 and 60 are transformed by analog-to-digital converters 61 and 62 into corresponding digital complex detection signals respectively. The digital complex detection signals are transmitted from the A/D converters 61 and 62 to an autocorrelator 65 via cancelers 63 and 64 respectively. The cancelers 63 and 64 serve to remove clutter components from the digital complex detection signals.

The autocorrelator 65 calculates an autocorrelation function of a resultant of the digital complex detection signals outputted from the A/D converters 61 and 62. A calculator 22 uses the autocorrelation function and thereby determines a component of a speed of moving liquid or part within a body in a direction perpendicular to the direction of travel of the ultrasonic wave beam. An image or frame member 23 temporarily holds an output signal from the calculator 22 which represents the calculated speed component. An output signal from the memory 23 is transformed by a digital-to-analog converter 24 into a corresponding analog video signal which is transmitted to a display 26 via a change circuit 25.

A phasing circuit 27 controls the reception received signals which are outputted from the reception amplifiers 4. A detector 28 derives a video signal from an output signal of the phasing circuit 27. The video signal is transformed by an analog-to-digital converter 29 into a corresponding digital signal which is temporarily stored in an image of frame memory 30. An output signal from the memory 30 is transformed by a digital-to-analog converter 31 into a corresponding analog video signal which is transmitted to the display 26 via a change circuit 32. The phasing circuit 27 is designed so that the display 26 can generate a B-scan mode image on the basis of the video signal fed via the change circuit 32.

More detailed description will follow. In the embodiment of FIG. 2, during the reception of ultrasonic wave beam pulses, ten transducer elements are simultaneously used in receiving echoes of ultrasonic wave beam pulses and they form four reception channels. Two transducer elements are allotted to in common to a pair of adjacent reception channels. The output signals from the phasing circuits 5-1, 5-2, ..., 5-j correspond to the respective channels. The transducer elements which are selected by the change circuit 2 are connected to the corresponding reception amplifiers 4. In order to control the reception directivity, output signals from the reception amplifiers 4 are inputted into taps of delay circuits DL having delay times corresponding to the transducers elements in connection with the reception amplifiers respectively. Output signals from the delay circuits DL are transmitted to adders 5A-1, 5A-2, ..., 5A-j of the phasing circuits 5-1, 5-2, ..., 5-j. In each of the four reception channels, the output signals from the delay circuits are summed by the adder. Pitches between adjacent reception channels correspond to distances between alternate transducer elements, so that it is possible to parallely obtain pieces of information which are spaced at intervals corresponding to two transducer elements and whose number equals to the number of the activated reception channels.

During the transmission of ultrasonic wave beam pulses, all of the transducer elements which are connected to the simultaneously activated reception channels are connected to the transmission circuit 3. The transducer elements which are connected to the transmission circuit 3 emit a pulse beam of ultrasonic waves in response to electric transmission pulses fed from the transmission circuit 3. The transmission circuit 3 adjusts the phases of the transmission pulses, thereby controlling the directivity of the ultrasonic wave beam.

As described previously, the received signals of respective reception channels which are outputted from the phasing circuits 5-1, 5-2, ..., 5-j are detected by detectors 6-1, 6-2, ..., 6-j respectively. The detected signals outputted from the detectors 6-1, 6-2, ..., 6-j are transmitted to the adders 59 and 60 via the weighting devices 71-1, 71-2, ..., 71-j, 72-1, 72-2 ..., 72-2j. The weighting process performed by the devices 71-1, 71-2, ..., 71-j, 72-1, 72-2, ..., 72-j is similar to a window process in general frequency analysis and serves to suppress a side robe of a frequency spectrum in a spatial frequency range. The adders 59 and 60 sums output received signals from the weighting devices 71-1, 71-2, ..., 71-j, 72-1, 72-2, ..., 72-j in such a manner that the signs of alternate groups are inverted, each group being composed of the received signals of two adjacent reception channels. The ways of the sign changes in the adders 59 and 60 are shifted from each other by a quantity corresponding to one reception channel. This deisgn enables the adders 59 and 60 to output complex detection signals having phase spatially different from each other by 90 degrees. The complex detection signals outputted from the adders 59 and 60 are transformed by the analog-to-digital converters 61 and 62 into corresponding digital complex detection signals respectively. The digital complex detection signals are transmitted from the A/D converters 61 and 62 to the autocorrelator 65 via the cancelers 63 and 64 respectively. The cancelers 63 and 64 serve to remove low-frequency components, that is, clutter components from the digital complex detection signals. The autocorrelator 65 calculates the autocorrelation function of a resultant of the digital complex detecton signals outputted from the A/D converters 61 and 62. The calculator 22 uses the autocorrelator function and thereby determines a component of a speed of moving liquid or part within a body in a directin perpendicular to the direction of the travel of the ultrasonic wave beam.

Figure 3:
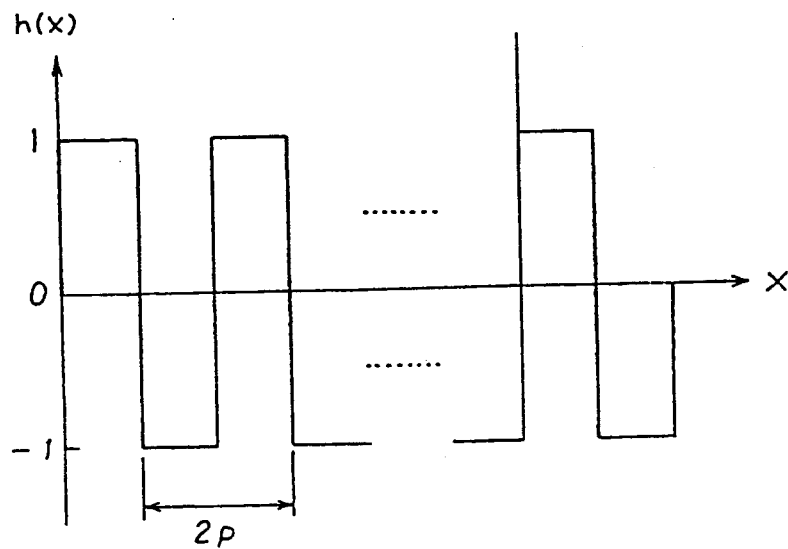
FIGS. 3 and 4 are diagrams showing characteristics of the adders of FIG. 1.
Figure 4:
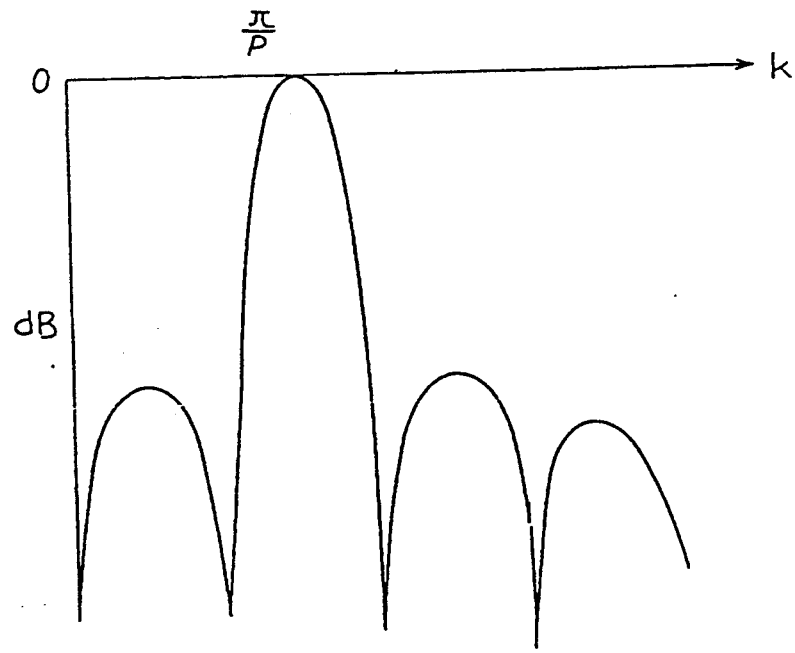

The following charactes are introduced to represent various functions. The characters f(x) denotes received signals in respective reception channels which depend on the motion of moving liquid or part of a body. The character h(x) denotes a function corresponding to operation of the adders 59 and 60 in which the signs of alternate groups each having the received signals of two adjacent reception channels are inverted and in which the inverted signals and the non-inverted signals are summed. As shown in FIG. 3, the function h(x) varies in a rectangular wave having a period 2p corresponding to twice a pitch "p" between the reception channels. The character g(x) denotes a resultant received signal which is derived by the summing process in the adderse 59 and 60. The character G($\omega$) denotes Fourier transform of the function g(x). The character H(k) denotes Fourier transform of the function h(x). The character F(k) denotes Fourier transform of the function f(x). The functions G, H, and F have a given relation as follows.

$$G(\omega) = (1/V) \cdot H^{\circ}(\omega/V) \cdot F(\omega/V) \tag{1}$$

where the character V denotes a speed of moving liquid or part of a body in a direction perpendicular to a direction of travel of an ultrasonice wave beam toward and into the moving liquid or part, and where the character H° denotes a complex conjugate to the function H. As shown in FIG. 4, the function H° (k) exhibits a sharp peak at the value "k" equal to "$\pi/p$" where the charater "p" denotes the pitch between the reception channels. The function F(K) is broad and varies gradually. Since the function G($\omega$) is a product of the function H° and F, the function $G(\omega)$ has a sharp peak. The frequency $\omega p$ at which the function $G(\omega)$ peaks has the following relation with the speed V of moving liquid or part of a body in the direction perpendicular to the direction of travle of the ultrasonic wave beam.

$$V = \omega p \cdot p / \pi \qquad (2)$$

An autocorrelation function of the received signal function $g(x)$ is represented by the character R(T) where "T" denotes the transmission pulse period. The auotcorrelator 65 derives this autocorrelation function R(T). By referring to Wiener-Khinchine therorem, the position or phase $\phi$ of the autocorrelation function R(T) has a given relation with the peak frequency $\omega p$ as follows.

$$\omega p = \phi / T \qquad (3)$$

The calculator 22 derives the phase $\phi$ of the autocorrelation function R(T) and then caculates the speed V of moving liquid or part of a body in the direction perpendicular to the direction of travel of the ultrasonic wave beam by referring to the equations (2) and (3). The signal representing the speed V is transmitted from the calculator 22 to the display 26 via the image memory 23, the D/A converter 24, and the change circuit 25. The display 26 indicates the speed V.

The autocorrelation function is periodically calculated from complex phase detection signals derived at intervals which correspond to a repetition period T of ultrasonic wave beam pulses. A predetermined number "i" of ultrasonic wave beam pulses are generated to obtain data of each of points in a scanning line. Accordingly, a number of autocorrelation functions which corresponds to the predetermined number "i" are calculated for data of each points in a scanning line, and these autocorrelation functions are averaged to form a final autocorrelation function from which the data are derived. The predetermined number "i" is given by the following equation.

$$i \cdot T \cdot N \cdot F = 1 \qquad (4)$$

where the character T denotes the repetition period of the ultrasonic wave beam pulses; the character N denotes a number of scanning lines forming a B-scan mode image; and the character F denotes a frame rate of the image or picture.

DESCRIPTION OF THE SECOND PREFERRED EMBODIMENT

Figure 5:
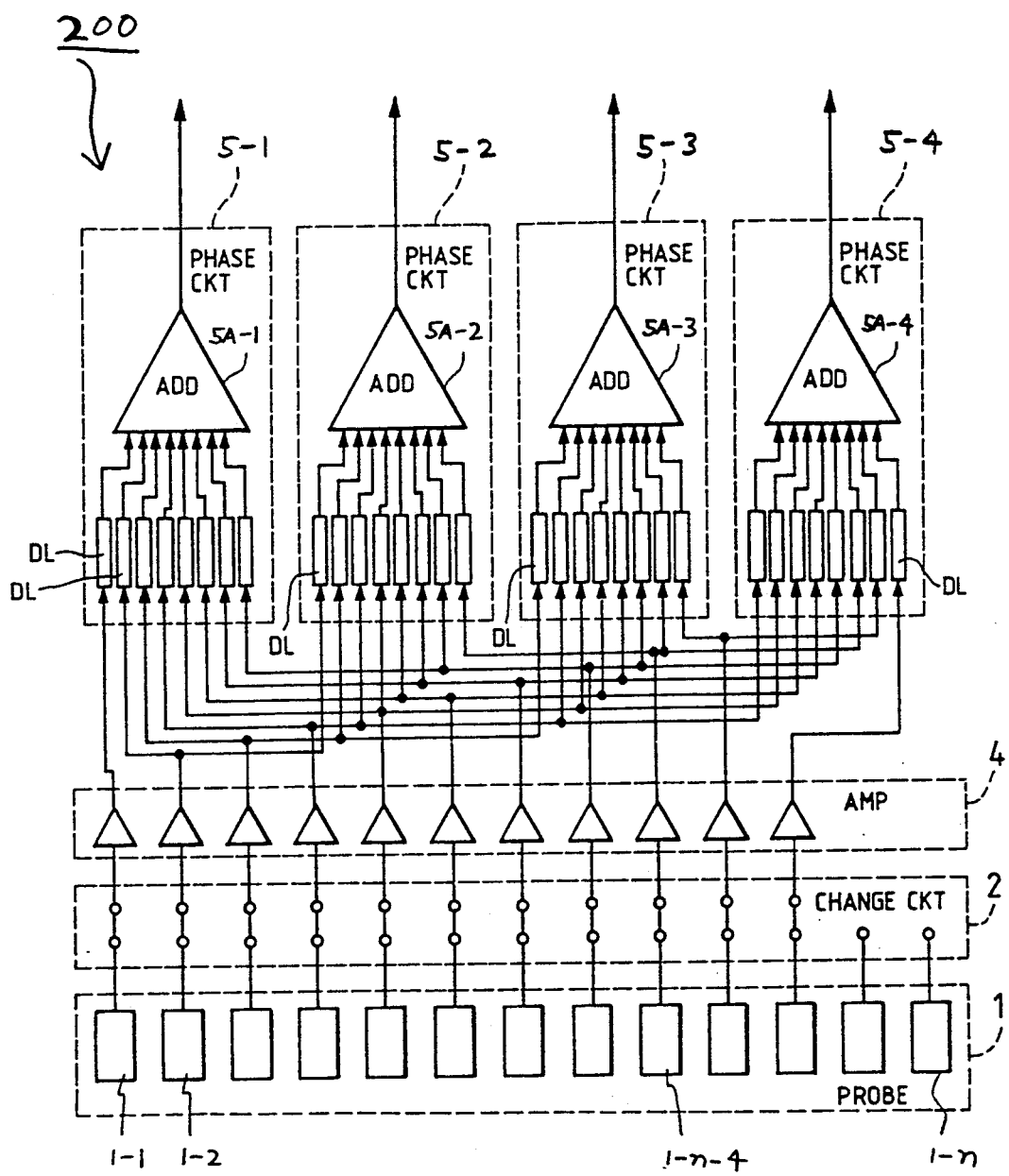
FIG. 5 is a block diagram of part of a parallel receiving circuit in an ultrasonic diagnostic apparatus according to a second embodiment of this invention.

FIG. 5 shows a second embodiment of this invention which is similar to the embodiment of FIGS. 1–4 except for a parallel receiving circuit 200. In the parallel receiving circuit 200 of FIG. 5: the number of simultaneously used reception channels is four; each channel is composed of either transducer elements; and pitches between adjacent reception channels correspond to distances between adjacent transducer elements.

What is claimed is:

1. An ultrasonic diagnostic apparatus comprising:
   means for emitting pulses of an ultrasonic wave beam into a body at a predetermined repetition period;
   means for receiving echo pulses of the ultrasonic wave beam via a plurality of different channels, and for simultaneously converting each of the received pulses into corresponding electric signals of the respective channels;
   a pair of adder means for inverting signs of alternate ones of pairs of the electric signals of adjacent channels, for summing the inverted sign electric signals with remaining non-inverted sign electric signals, and for converting the electric signals into a pair of complex signals having phases which are spatiallyu different from each other by 90 degrees;
   means for calculating an autocorrelation function of the complex signals; and
   means for calculating a component of a speed of moving matter within the body in a predetermined direction on the basis of the autocorrelation function, wherein the moving matter causes the echo pulses and wherein the predetermined direction is perpendicualr to a direction of travel of the ultrasonic wave beam pulses.

2. The ultrasonic diagnostic apparatus of claim 1 further comprising means connected between the echo-receiving means and the adder means for weighting the electric signals and outputting the weighted electric signals to the adder means.

3. The ultrasonic diagnostic apparatus of claim 1 further comprising means for indicating the calculated component of the speed of the moving matter.

* * * * *